United States Patent Office 3,438,970
Patented Apr. 15, 1969

3,438,970
STORAGE-STABLE CYANAMIDE-STARCH AND METHOD FOR THE MANUFACTURE THEREOF
Ralph Joseph Chamberlain, Glenbrook, and Daniel Elmer Nagy, Stamford, Conn., assignors to American Cyanamid Company, Stamford, Conn., a corporation of Maine
No Drawing. Filed Nov. 13, 1964, Ser. No. 411,102
Int. Cl. C08b 19/04, 25/02; D21h 3/28
U.S. Cl. 260—233.3       5 Claims

ABSTRACT OF THE DISCLOSURE

An improvement in the preparation of cyanamide starch which results in a storage stable product. The process consists of reacting granular starch with cyanamide in an aqueous alkaline medium then acidifying said slurry to a pH below 3 and gelatinizing the cyanamide starch product before it is dried.

---

The present invention relates to a dry, storage-stable, cold water-dispersible, acid addition product of cationic cyanamide-starch, and methods for the manufacture thereof.

Elizer et al. U.S. Patent No. 3,051,699 (Aug. 28, 1962) discloses the manufacture of an acid addition product of the catienic reaction product of cyanamide with starch (hereinafter termed "cyanamide-starch" by reacting granular starch with cyanamide in aqueous alkaline medium followed by acidification and drying without gelatinization. While the resulting cyanamide-starch product is a strengthening agent for paper when used as soon as manufactured, it loses most of its value as strentgheing agent after it has been stored a short time. Cationic cyanamide-starch which loses more than 20% of its dry strength effectiveness in 60 days is regarded as unsatisfactory.

The discovery has now been made that cationic cyanamide-starch can be prepared in dry state which is storage stable for extended periods of time by introducing a combination of two specific steps in the aforementioned process.

The first step is the reaction of the initial cyanamide-starch product with acid at a pH less than 3. The second step is the conversion of the granular acid-treated cyanamide-starch into gelatinized starch prior to the step in which the acid-treated cyanamide-starch is dried.

Both steps are critical, and neither step is effective in causing stabilization without the other.

In preferred embodiments, the cyanamide-starch of the present invention remains cold water-soluble and remains a valuable dry-strength agent for paper even after storage for two months at 75° C.

More in detail, according to the process of the present invention, granular starch is slurried in water and is reacted with cyanamide in customary amount and at a customary alkaline pH, so as to impart cationic capabilities to the starch. The reaction temperature is maintained below and preferably far below the gelatinization temperature of the starch. The slurry is then treated with sufficient of a strong acid to decrease the pH of the slurry to a value below 3 and preferably to a value below 1. The action of the acid on the cyanamidle starch is rapid and is generally complete within about an hour.

The resulting granular acid addition product of cyanamide-starch is then gelatinized by heating to the customary gelatinization temperature for starch, after which the resulting pasty gel is dried in any convenient way.

The first step of the process is known and is performed at a pH above 8 and preferably in the range of 10–12. While cyanamide itself ($H_2NCN$) can be used as the starting material, metal cyanamides may be employed instead; it is believed that at the pH range mentioned cyanamide and the water-souble metal salts of cyanamide each react with starch in substantially the same manner with substantially the same result.

In the acidification step, hydrochloric acid, sulfuric acid, nitric acid, and combinations thereof can be used.

The precise pH to which the cyamide-starch slurry is best acidified has not been ascertained. Our data show that a storage-stable starch product is not attained when the slurry is acidified no lower than a pH of 3. Our data further show that very satisfactory results are attained when the slurry is acidified to a pH of 1. What we regard as a primary feature of our invention, consequently, is the step of acidifying the slurry to a pH below 3 at least momentarily with a strong acid.

The invention does not depend upon the particular way in which the granular acid-treated cyanamide-starch is gelatinized, and any method heretofore employed in the past for this purpose can be used. Thus, the slurry may be brought to the boil by means of steam coils and maintained at about that temperature for the necessary time to gelatinize the starch. We have found it about as effective a method, and more economical and convenient, to filter off the water from the slurry of acid-reacted cyanamide-starch granules and then to feed the resulting cake of granules to a drum drier having a drum temperature above about 212° F. so as to maintain a pool of very hot or boiling cyanamide-starch in the nip of the rolls. Gelatinization of the cyanamide-starch proceeds to a satisfactory extent within the pool.

Any convenient method can be employed for recovering the gelatinized acid-treated cyanamide-starch product in apparently dry state. Thus the product can be recovered in dry state by precipitating the product by use of an anhydrous wate-soluble liquid such as methanol or ethanol, filtering off the liquid phase, and allowing the liquid in the precipitated starch product to evaporate.

It is more economical to perform the drying in standard driers for example spray driers, tray driers, or drum driers. The drying need not be carried beyond the point at which the product is apparently dry. We have found it satisfactory to dry the cyanamide-starch to a water content of about 10% by weight. At that moisture content the cyanamide-starch is apparently dry to the touch and dissolves in water generally more readily than cyanamide-starch which has been dried more completely.

The reason why the product of the present invention is so stable is not known and we do not understand why the combination of very low pH during acidification with the step of gelatinization before drying should produce the remarkable improvement in stability which we have discovered. We are, therefore, unable to describe our product in terms other than the manner in which it is made.

The invention is further described by the examples which follow. These examples are best embodiments of

3 the invention and are not to be construed as limitations thereon.

Example I

The following illustrates the preparation of a dry, storage-stable cold-water dispersible cationic acid addition product of cyanamide-starch.

To 1000 g. of commercial raw corn starch is added with stirring 50 g. (dry basis) of cyanamide ($H_2NCN$) and 1250 cc of water. The pH of the resulting slurry is adjusted to 11 by addition of strong sodium hydroxide solution. The resulting slurry is maintained at 25° C. for 18 hours.

Run A.—Half of the batch is adjusted to pH 1.0 by addition of 10% aqueous hydrochloric acid. After one hour of standing at 20° C. the slurry (acid-treated granular cyanamide-starch) is filtered. The cake (containing 55% solids by weight) is fed to a laboratory drum drier having a drum temperature of 250° F. at such rate that a pool of hot fluid cake is constantly in the nip of the rolls. The acid-treated granular cyanamide-starch gelatinizes in this pool, before it is carried from this pool by rotation of the drum. The flakes from the drum are apparently dry but contain 10% moisture by weight.

The flakes are cold-water soluble and they remain cold-water soluble after 48 days of storage in a stoppered bottle at 75° C. The flakes initially (on coming off the drum) are an effective dry strength agent for paper, and the effectiveness of the material remains high after storage as described.

Run B.—The other half of the slurry is adjusted to pH 3.0 with concentrated hydrochloride and is then processed in the same manner thenceforward as batch A, without further acidification. The dried product is soluble in neither hot nor cold water after 48 days of storage at 75° C. and consequently does not possess satisfactory storage stability.

Example II

The procedure of Run A of Example I is repeated except that the slurry of acid-treated granular cyanamide-starch is diluted to 5% solids with water. The dilute slurry is cooked at 90° C.–100° C. to gelatinize the starch, and 1000 cc. of the resulting solution is mixed with 800 cc. of acetone instead of being drum-dried. Acid-treated gelatinized cyanamide-starch precipitates. The precipitate is tray dried at 40° C. The product has substantially the same properties as the dry product of Run A.

Example III

The procedure of Example II is repeated except that the precipitating agent is 2–B ethanol. Substantially the same product is recovered.

Example IV

The following illustrates a procedure wherein the acid-treated granular cyanamide-starch is gelatinized by a separate heating step.

A mixture of 600 g. of granular potato starch and 30.0 g. of cyanamide ($H_2NCN$) is slurried in 700 cc. of water containing 15.0 g. of sodium hydroxide. The slurry is held at 40° C. for 4 hours; its pH is about 11.5. The pH is then adjusted to 1.0 by addition of 10% aqueous hydrochloric acid. After 1 hour at 40° C. wtih continued stirring the slurry is added to 10 liters of boiling water and the mixture is held at or near the boil for 20 minutes.

The product is drum-dried (drum temperature 250° F.) and is stable for 95 days at 70° C. It is substantially the same as the product of Run A of Example I.

Example V

The procedure of Example IV is repeated using in each instance tapioca, rice, wheat, sago, waxy maize starch, acid-treated starch, and oxidized starch. Results in each instance are substantially the same.

Example VI

The procedure of Example IV is repeated except that 10% aqueous nitric acid is used in place of the hydrochloric acid. Results are substantially the same.

Example VII

The following illustrates the criticality of the combination of the step of acidifying the cyanamide-starch slurry to a pH below 3 with the step of gelatinizing the acid-treated starch-cyanamide before drying.

The procedure of Example I for the preparation of cyanamide-starch is repeated through the stages where the granular starch is reacted with the cyanamide and the resulting slurry of granular cyanamide-starch is maintained at 25° C. for 18 hours. The batch is then divided into three equal parts, which are respectively further processed as follows.

Run A.—This portion is processed by the method employed in Run A of Example I.

Run B.—This portion is processed in the same manner as Run A except that the cyanamide-starch slurry is acidified no further than to pH 3.

Run C.—This portion is processed in the same manner as Run A, except that the acid-treated granular cyanamide-starch is not gelatinized before being dried but is tray-dried at 40° C., without gelatinization.

The products are stored in stoppered bottles for 25 days. A part of the product of Run C is gelatinized by heating in water at 90° C.

The product of Run B does not dissolve in either cold (20° C.) or hot (90° C.) water. It is consequently discarded.

A determination is made of the comparative storage stability of the products of Runs A and C by standard laboratory method used for determining the effectiveness of cationic dry strength agents for paper. According to this method, sufficient of a 1% by weight solution of the agent is added to an aqueous suspension of beaten cellulose papermaking fibers at 0.6% consistency to provide 1% of the agent based on the dry weight of the fibers, gently stirring the suspension for a few minutes to allow adsorption of the agent to go to equilibrium, sheeting the suspension to form handsheets of about 50 lb. basis weight (25" x 40"/ream) drying the handsheets at 220° F. on a laboratory drum drier, and determining the bursting strength of the resulting sheets. Control handsheets are made in the same manner except that no agent is added to the fibrous suspension.

The procedure is repeated with the remainder of the product of Run A after a total of 41 days of storage. The values obtained are as follows.

| Run | Cyanamide, Starch | | Dry strength (Mullen) | |
|---|---|---|---|---|
| | Days stored [1] | Percent used [2] | Found, lb. | Percent increase |
| A | | None | 58.0 | (Control) |
| A | 0 | 1 | 77.6 | 38.8 |
| A | 25 | 1 | 77.4 | 38.5 |
| A | 41 | 1 | 74.4 | 34.5 |
| C | 0 | 1 | 77.6 | 38.8 |
| C | 25 | 1 | 59.2 | 0.2 |

[1] At 40° C.
[2] Based on dry weight of the fibers.

The results show that the product of Run A possesses satisfactory storage-stability, whereas the product of Run C is unsatisfactory in this respect.

We claim:

1. In the process for the manufacture of dry cationic acid-treated cyanamide-starch wherein granular starch is reacted as a slurry with a cyanamide in aqueous alkaline medium thereby forming a slurry of cyanamide-starch, the resulting slurry is acidified thereby forming acid-treated cyanamide-starch, and said acid-treated cyanamide-starch is tried; the improvements which consist in the combination of steps of (a) acidifying said slurry of cyanamide-starch to a pH below 3, and (b) gelatinizing said acid-treated cyanamide-starch before said acid-treated cyanamide-starch is dried.

2. A process according to claim 1 wherein said cyanamide-starch slurry is acidified to about pH 1.

3. A process according to claim 1 wherein said acid is hydrochloric acid.

4. A process according to claim 1 wherein said acid is nitric acid.

5. Dry gelatinized acid-treated cyanamide-starch prepared by a method according to claim 1.

References Cited

UNITED STATES PATENTS 3,051,700   8/1962   Elizer et al. _____ 260—233.3

HOSEA E. TAYLOR, Jr., *Primary Examiner.*

R. W. MULCAHY, *Assistant Examiner.*

U.S. Cl. X.R.

106—213; 162—175